United States Patent
Fritsch et al.

[19]

[11] Patent Number: 6,056,910
[45] Date of Patent: *May 2, 2000

[54] PROCESS FOR MAKING A NET SHAPED COMPOSITE MATERIAL FIXED ANGLE CENTRIFUGE ROTOR

[75] Inventors: Don Fritsch, San Jose; Alireza Piramoon, Santa Clara; Robert Wedemeyer, Palo Alto, all of Calif.

[73] Assignee: Piramoon Technologies, Inc., Mountain View, Calif.

[ * ] Notice: This patent is subject to a terminal disclaimer.

[21] Appl. No.: 08/863,248

[22] Filed: May 27, 1997

Related U.S. Application Data

[63] Continuation of application No. 08/561,524, Nov. 21, 1995, abandoned, which is a continuation-in-part of application No. 08/431,544, May 1, 1995, Pat. No. 5,643,168.

[51] Int. Cl.$^7$ .................................................. B29C 43/18
[52] U.S. Cl. .......................... 264/319; 264/257; 264/258; 264/325; 494/12; 494/16; 494/43; 494/81
[58] Field of Search .................................... 264/257, 258, 264/319, 325; 494/12, 16, 21, 33, 81, 85, 31, 43

[56] References Cited

U.S. PATENT DOCUMENTS

| | | | |
|---|---|---|---|
| 1,979,954 | 11/1934 | Bergman | 18/59 |
| 2,028,040 | 1/1936 | Benge | 117/27.5 |
| 2,128,097 | 8/1938 | Mains | 117/27.5 |
| 2,372,983 | 4/1945 | Richardson | 57/76 |
| 2,447,330 | 8/1948 | Grebmeier | 494/16 |
| 2,525,469 | 10/1950 | Anderson | 57/76 |
| 2,594,693 | 4/1952 | Smith | 57/76 |
| 2,827,229 | 3/1958 | Blum | 494/16 |
| 2,965,220 | 12/1960 | Naul | 206/2 |
| 3,248,046 | 4/1966 | Feltman, Jr. et al. | 233/26 |
| 3,779,451 | 12/1973 | Lehman | 494/16 |
| 3,913,828 | 10/1975 | Roy | 233/27 |
| 3,970,245 | 7/1976 | Aeschlimann | 494/16 X |
| 4,412,830 | 11/1983 | Strain et al. | 494/16 X |
| 4,468,269 | 8/1984 | Carey | 156/175 |
| 4,512,202 | 4/1985 | Wright et al. | 494/16 X |
| 4,738,656 | 4/1988 | Piramoon et al. | 494/81 |
| 4,781,669 | 11/1988 | Piramoon | 494/16 |
| 4,790,808 | 12/1988 | Piramoon | 494/81 |
| 4,801,290 | 1/1989 | Gunter | 494/16 |
| 4,817,453 | 4/1989 | Breslich, Jr. et al. | 74/572 |
| 4,820,257 | 4/1989 | Ishimaru | 494/16 |
| 4,824,429 | 4/1989 | Keunen et al. | 494/16 |
| 4,860,610 | 8/1989 | Popper et al. | 74/572 |
| 4,991,462 | 2/1991 | Breslich, Jr. et al. | 74/572 |
| 5,057,071 | 10/1991 | Piramoon | 494/16 |
| 5,362,301 | 11/1994 | Malekmadani et al. | 494/81 X |
| 5,382,219 | 1/1995 | Malekmadani | 494/16 |
| 5,484,381 | 1/1996 | Potter | 494/12 |
| 5,505,684 | 4/1996 | Piramoon | 494/16 |
| 5,562,554 | 10/1996 | Carson | 494/12 |
| 5,643,168 | 7/1997 | Piramoon et al. | 494/16 |
| 5,776,400 | 7/1998 | Piramoon et al. | 264/219 |
| 5,833,908 | 11/1998 | Piramoon et al. | 264/250 |

FOREIGN PATENT DOCUMENTS

| | | | |
|---|---|---|---|
| 1939177 | 9/1970 | Germany | 494/16 |
| 2907001 | 8/1979 | Germany | 494/16 |

*Primary Examiner*—Jan H. Silbaugh
*Assistant Examiner*—Stefan Staicovici
*Attorney, Agent, or Firm*—Townsend and Townsend and Crew LLP

[57] ABSTRACT

In a fixed angle centrifuge having sample tube apertures symmetrically distributed around the spin axis of a rotor body, two rotor body shapes are disclosed at the rotor body top adjacent the openings to the sample tube apertures. These shapes each permit both release of the sample tube aperture cores and maintain the intersection of the top of the sample tube aperture within a plane normal to the axis of the sample tube aperture. A first shape includes placing discrete facets at the top of the rotor body adjacent the sample tube aperture openings. The second, and preferred embodiment, includes generating a spherical surface utilizing a spherical radius which is taken from the intersection of the spin axis of the rotor and the axes from each of the sample tube apertures. In both cases, precise termination of material molding the rotor body occurs at the top of the cylindrical portion of the sample tube aperture. Sample tube aperture core withdrawal easily occurs. Further, the ultimately formed sample tube aperture easily supports the sample and sample tube during centrifugation.

3 Claims, 7 Drawing Sheets

PROCESS FOR MAKING A NET SHAPED COMPOSITE MATERIAL FIXED ANGLE CENTRIFUGE ROTOR

This application is a Continuation of U.S. patent application Ser. No. 08/561,524 filed Nov. 21, 1996, now abandoned, which is a Continuation-In-Part of U.S. patent application Ser. No. 08/431,544, filed May 1, 1995, now U.S. Pat. No. 5,643,168, issued Jul. 1, 1997, which is incorporated herein by reference.

This invention relates to composite material fixed angle centrifuge rotors. More particularly, a rotor construction is disclosed in which sample tube apertures can be molded at the top of the rotor as part of the net shape process without the complications of machining.

Further, that Continuation-In-Part Patent Application entitled Compression Molded Rotor Having Sample Tube Aperture Inserts filed of even date herewith, now U.S. Pat. No. 5,643,168 issued Jul. 7, 1997 discloses sample tube aperture inserts which fit around the sample tube aperture cores illustrated and used with this invention. These inserts constitute the preferred embodiment of this invention. Accordingly, this application is incorporated herein by reference.

BACKGROUND OF THE INVENTION

In Piramoon et al U.S. patent application Ser. No. 08/431,544 filed May 1, 1995 entitled Compression Molded Centrifuge Rotor and Method Therefore, now U.S. Pat. No. 5,643,168 issued Jul. 1, 1997 a method for the net shape molding of a fixed angle centrifuge rotor was disclosed. This application relates to a discovery which we have made in the process of molding such rotors as well as the product produced by the net molding process.

Fixed angle centrifuge rotors are well known. By convention, such fixed angle centrifuge rotors include plurality of sample tube apertures having inserted inclined sample tubes. Typically, the open top of the sample tube is adjacent the spin axis of the rotor; the closed bottom of the sample tube is remote from the spin axis of the rotor and extends towards the rotor bottom. The sample tube is placed within a plane including the spin axis of the rotor and inclined at 23.5° with respect to the spin axis of the rotor.

During centrifugation, heavy particles within the sample migrate under enhanced gravity fields to the bottom and outside of the sample tubes; light particles remain at the top inside of the sample tubes.

So called fixed angle rotors of composite material have usually been fabricated from layers of composite cloth, the cloth layers being normal to the spin axis of the rotor. In order to prevent delamination of such rotors, it has been necessary to provide the rotors with a spiral wind of exterior composite fiber. Because of the necessity of maintaining such fiber on the exterior of the rotor, sample tube inclination is not standard. Specifically, sample tube inclination in such rotors is at about 19°.

In our Piramoon et al U.S. patent application Ser. No. 08/431,544 filed May 1, 1995 entitled Compression Molded Centrifuge Rotor and Method Therefore, now U.S. Pat. No. 5,643,168 issued Jul. 1, 1997 we have disclosed the production of a compression molded centrifuge rotor body. This compression molded centrifuge rotor body makes possible inclination of the sample tube apertures at the conventional 23.5° from the spin axis of the rotor body. Further, it allows the sample tube apertures to be created as part of the net shape molding process; the sample tube apertures no longer have to be independently machined.

In the molding and testing of such centrifuge rotors, we have discovered that there can be a weakness where fibers are compression molded for forming a rotor body. Specifically, the sample tube aperture contains the sample tube with the sample being centrifugated. This sample tube when fully loaded tries to move downward within the sample tube aperture. Such downward movement places increased strain on the bottom of the rotor. Similar to the case of the composite rotor constructed of laminates, this strain can either de-laminate the rotor and cause rotor failure.

An attempt has been made to remedy this condition by compression molding the rotors without the sample tube aperture cores being present. This has proved unsatisfactory for several reasons.

First, it is most desirable to compression mold rotors utilizing so-called sheet molding compound. Sheet molding compound in the vicinity of the sample tube apertures is usually placed normal to the spin axis of the rotor. Where a rotor is molded with the sample tube aperture cores not utilized to form the sample tube apertures, the sheet molding compound remains largely undisturbed; the sheet molding compound naturally disposes the fibers normal to the spin axis of the rotor. Unfortunately, when the discontinuous fibers utilized in compression molding are largely undisturbed, and remain normal to the spin axis of the rotor, they can easily de-laminate. We have in fact observed delamination under centrifugation when the sample tube apertures of a fixed angle rotor having machined sample tubes are loaded and centrifugated with samples.

Second, machining places strains on the rotor body; it is desirable to construct and vend a rotor body which has not be subjected to machining—especially in the interior of the rotor body.

Third, machining creates a cost factor. Rotors where the sample tube apertures are individually machined are very much more expensive than rotors that can be molded to net shape—including the sample tube apertures.

Fourth, we have discovered that machining leaves imbedded stress cracks—especially in the areas of the sample tube apertures. At a minimum, these imbedded cracks are unsightly and unsettling to the owner of the rotor. Further, such cracks can propagate to produce rotor destruction.

Because of at least these deficiencies, we have undertaken to "net shape" our rotors. In the process of this net shaping, we have discovered a problem related-to the release of the sample tube aperture cores which form the sample tube apertures during the net shape molding.

To understand this problem, the mold must first be described with respect to FIG. 1. Thereafter, the so-called yoke of the mold in holding the sample tube aperture cores will be discussed. Areas of "undercut" will be shown. Finally, it will be seen how undercut prevents convenient withdrawal of the sample tube aperture cores and damages the net shape molded rotor body. Thereafter, the solutions—two in number—will be set forth.

Referring to FIG. 1, closed mold M is illustrated having upper section 14 and lower section 15. Upper section 14 includes upper base 17, ram sleeve 18, and ram 19. Supported on upper base 17 is mold insert I having rotor bottom forming surface 30 and rotor bottom step forming surfaces 32.

Lower section 15 includes ejector bar 20 and lower base 22. Lower base 22 defines interiorly thereof frustum shaped cavity 23 having steps 24 defined on the surface thereof. When a rotor body is formed interiorly of open mold M, these steps 24 form exterior and complimentary steps on the surface of the rotor body which when machined allow windings to reinforce the rotor.

Ejector bar 20 supports ejector plate 26 which in turn supports yoke Y. Some special attention can be given to the construction of yoke Y.

Formed rotor body B is shown interior of lower base 22. Presuming that rotor body B has been molded interior of lower base 22, release from frustum shaped cavity 23 interior of the lower base must occur. To this end, sample tube aperture cores A must be held interior of frustum shaped cavity 23. The construction of the sample tube aperture cores A can be best understood with reference to FIG. 3.

Referring to FIG. 3, sample tube aperture cores A have frustum shaped portion 34 and cylindrical shaped portion 36 with rounded bottom 38. Cylindrical shaped portion 36 forms sample tube aperture P.

Returning to FIG. 1, frustum shaped portion 34 insures release of sample tube aperture cores A from mold insert I. It will be observed that frustum shaped portion 34 of sample tube aperture cores A fits within female frustum aperture 42. Both frustum shaped portion 34 and female frustum aperture 42 have a slope adjacent mold axis 40 that permits upward withdrawal of rotor body B with sample tube aperture cores A within the rotor body. Once rotor body B is clear of mold M, sample tube aperture cores A may then be withdrawn.

Upon the original construction of mold M, removal of sample tube aperture cores A was intended. Unfortunately, the required shape of yoke Y with respect to sample tube aperture cores A at frustum shaped portion 34 was not understood. It was at this juncture, that the magnitude of the problem relating to "undercut" occurs.

Referring to FIGS. 2 and 3, sample tube aperture cores A can be observed where they join to yoke Y. Specifically, upper surface 45 of yoke Y joins to frustum shaped portion 34 of sample tube aperture cores A. It will be observed that undercut 48 exists adjacent frustum shaped portion 34 of the sample tube aperture core A.

The affect of this undercut 48 can be understood with specific reference to FIG. 3. Specifically, and when the rotor body is molded, compressed fibers will form about frustum shaped portion 34 of sample tube aperture cores A. The sample tube aperture cores A will be trapped within molded rotor body B.

Removal of sample tube aperture cores A will only aggravate the problem. Specifically, forcible removal will cause sections of rotor body B to break away. This breaking away can weaken the rotor body, especially at web 50 between sample tube apertures P.

It is also desirable for cosmetic purposes that finished rotor body B have the top of sample tube apertures P at the same elevation. Further, for the purposes of required biocontainment, having the sample tube aperture terminate an a uniform elevation from the bottom of the sample tube allows biocontainment structures to be conveniently attached between the top of the sample.

The reader will understand that invention can be claimed in understanding the problem to be solved. We are unaware of the prior art either disclosing or suggesting the problems that we have encountered. Accordingly, we claim invention related to the discovery of the above problems as well as the required solution.

SUMMARY OF THE INVENTION

In a fixed angle centrifuge having sample tube apertures symmetrically distributed around the spin axis of a rotor body, two rotor body shapes are disclosed at the rotor body top adjacent the openings to the sample tube apertures. These shapes each permit both release of the sample tube aperture cores and maintain the intersection of the top of the sample tube aperture within a plane normal to the axis of the sample tube aperture. A first shape includes placing discrete facets at the top of the rotor body adjacent the sample tube aperture openings. The second, and preferred embodiment, includes generating a spherical surface utilizing a spherical radius which is taken from the intersection of the spin axis of the rotor and the axes from each of the sample tube apertures. In both cases, precise termination of material molding the rotor body occurs at the top of the cylindrical portion of the sample tube aperture. Sample tube aperture core withdrawal easily occurs. Further, the ultimately formed sample tube aperture easily supports the sample and sample tube during centrifugation.

DESCRIPTION OF THE PREFERRED EMBODIMENT

Figure 1:
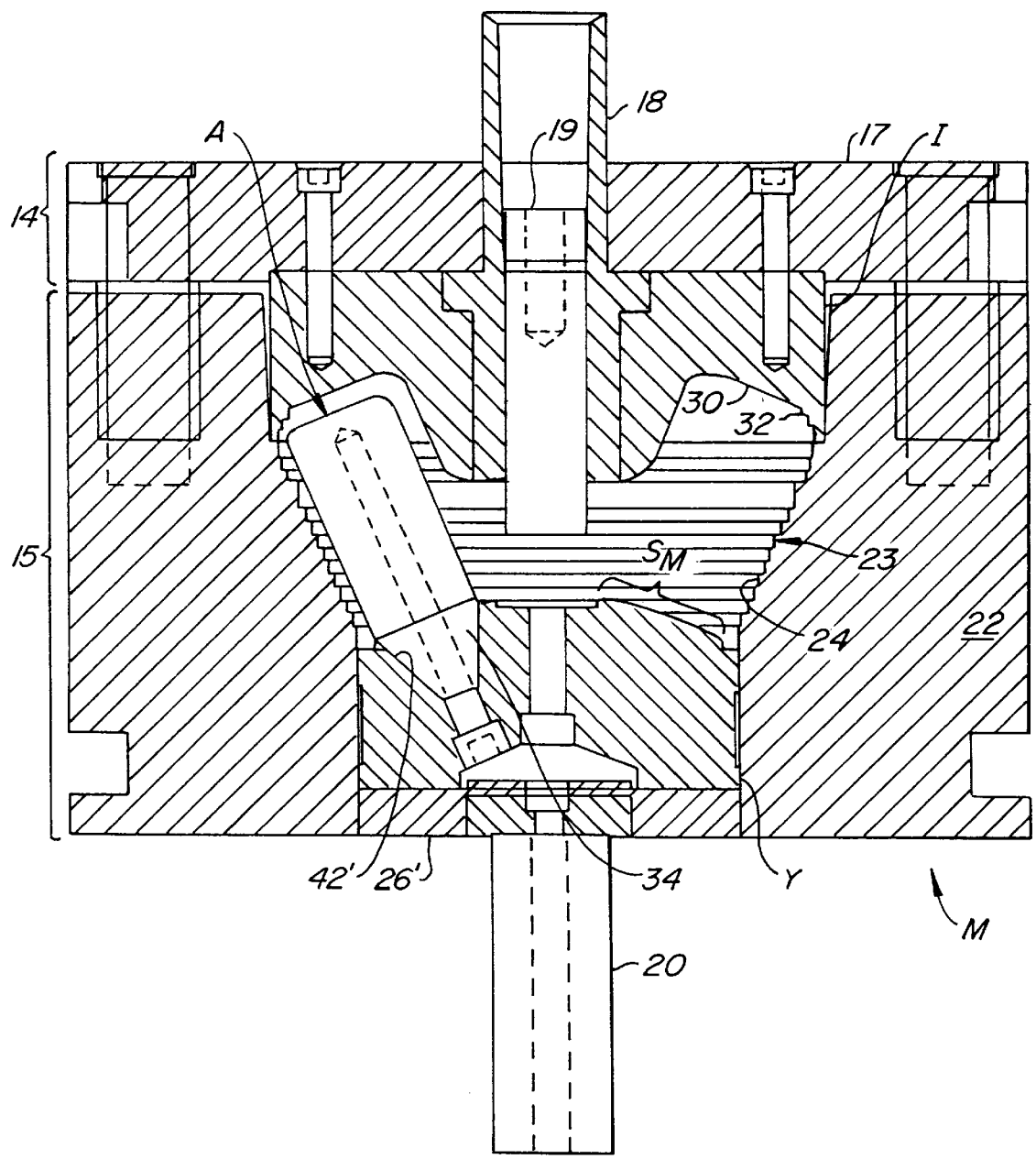
FIG. 1 is a side elevation section of the mold of this invention shown in the closed position for the net shape molding of compressed composite fiber material into a fixed angle centrifuge rotor.
Figure 2:
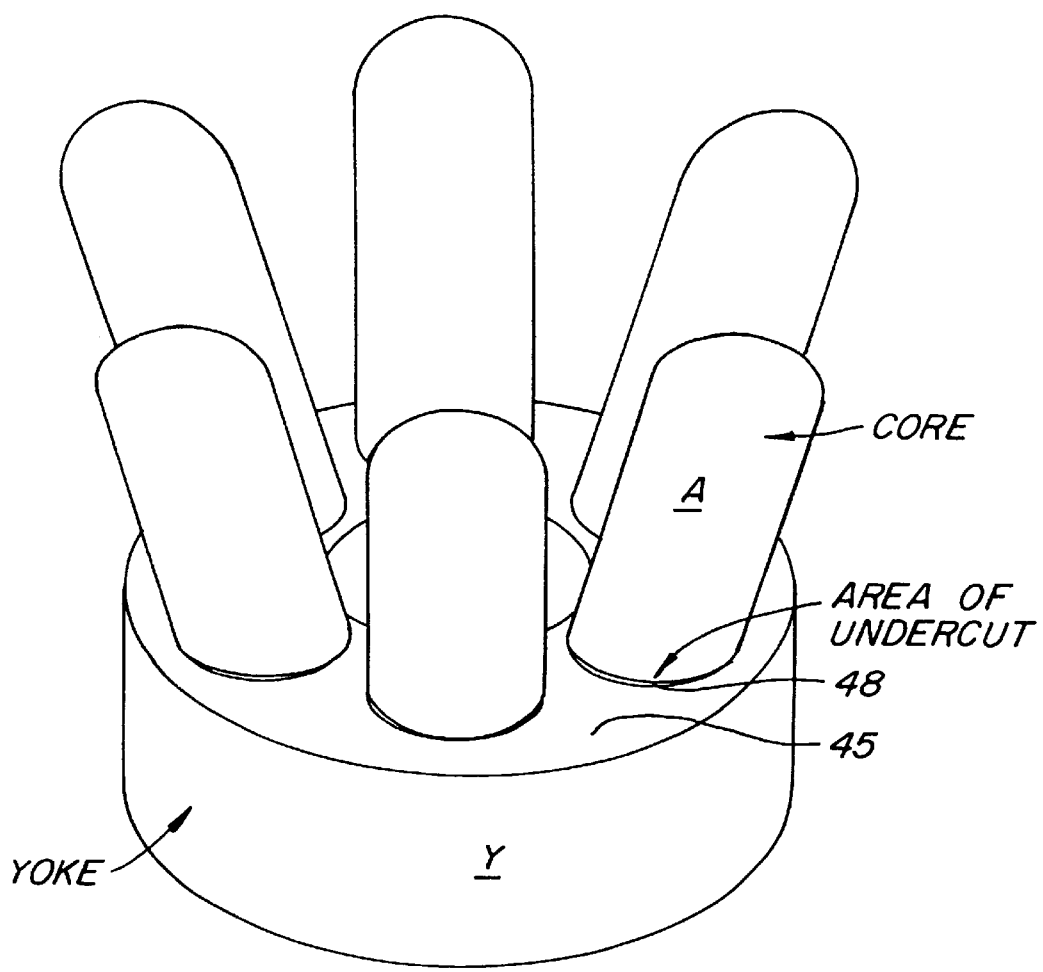
FIG. 2 is a perspective view of the yoke of the mold of FIG. 1 with the sample tube aperture cores assembled to the yoke and illustrating the exposed undercut between the cylindrical portion of the sample tube aperture core and the male conical portion of the sample tube aperture core which is mounted to a complimentary female conical portion within the mold yoke.
Figure 3:
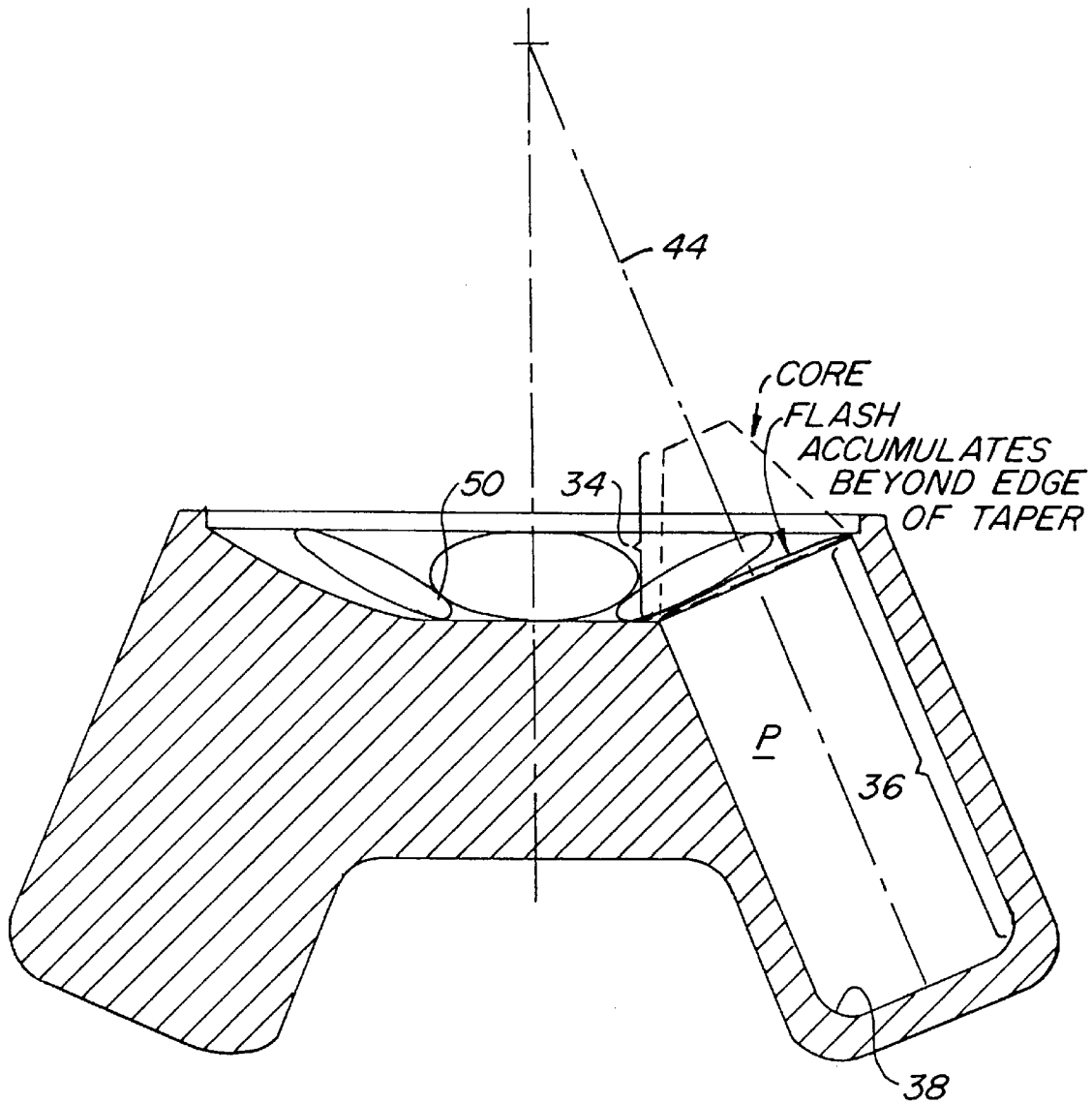
FIG. 3 is a side elevation section of a Prior Art rotor with the sample tube aperture core shown in broken lines illustrating how a rotor molded with undercut as illustrated in FIG. 2 has the sample tube aperture cores trapped within the molded rotor body making removal only possible with some damage to the molded rotor body.
Figure 4:
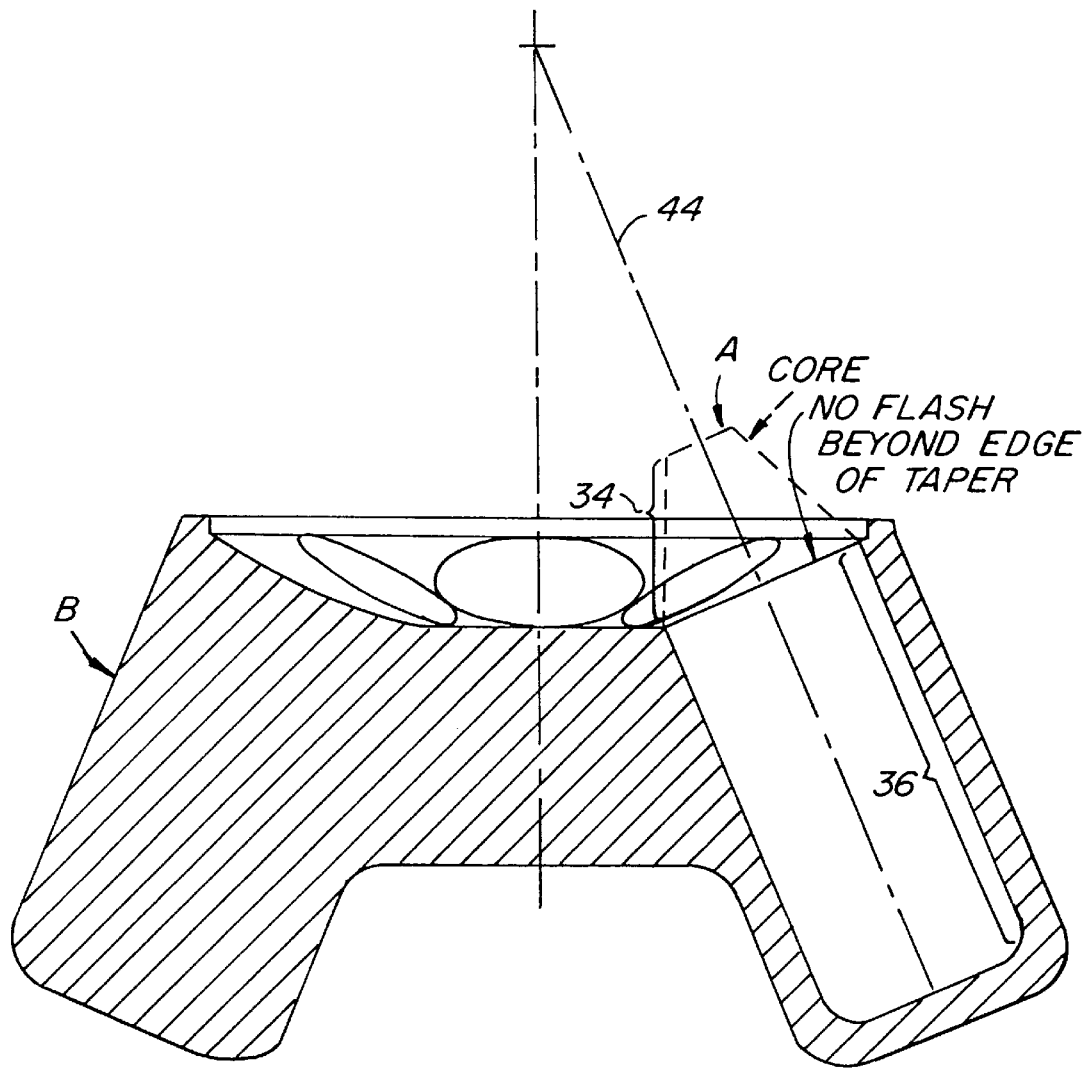
FIG. 4 is a side elevation illustrating the desired condition for extraction of the sample tube aperture cores.

Referring to FIG. 4, the solution to the above problem is set forth. Sample tube aperture core A is shown immediately before extraction from rotor body B. It is required that rotor body B terminate precisely at the interface between cylindrical shaped portion 36 and frustum shaped portion 34. This enables free withdrawal of sample tube aperture cores A without entraining portions of rotor body B.

Figure 5:
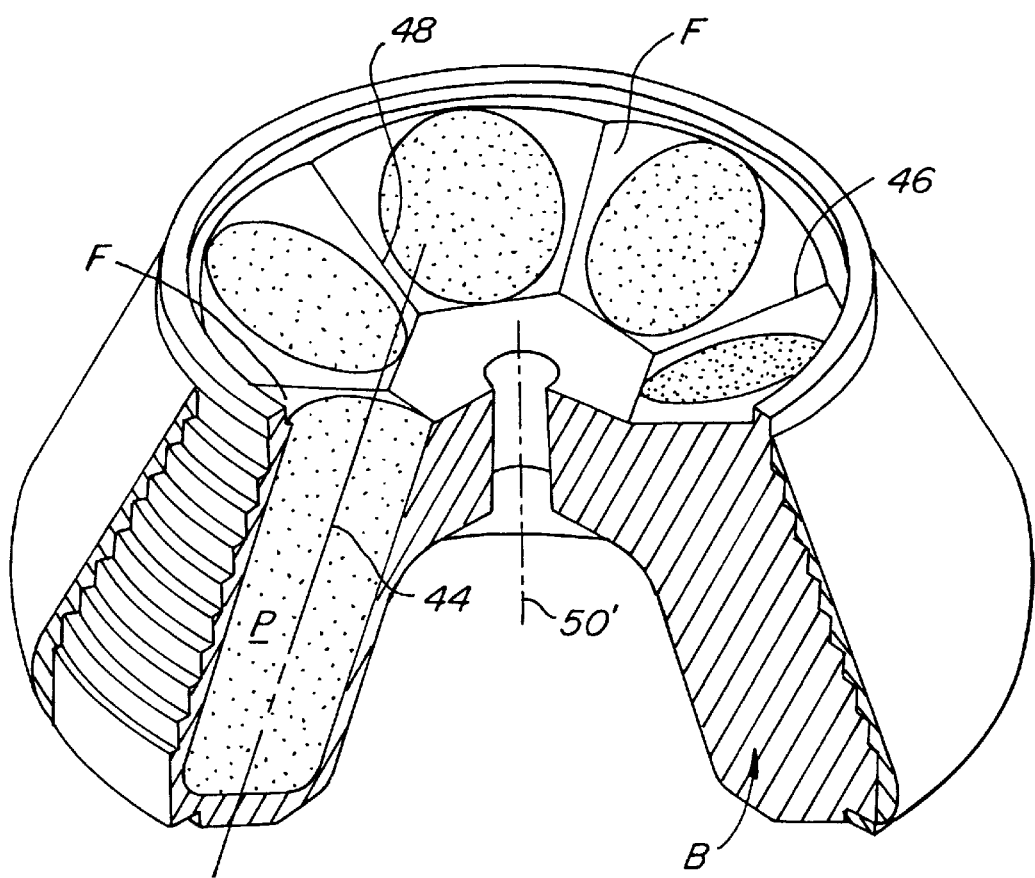
FIG. 5 illustrates the first of two solutions in the form of discrete facets placed adjacent the sample tube aperture cores at the juncture between the cylindrical portion and conical portion of the sample tube aperture cores.

There are two solutions to this problem. The less preferred solution is shown in FIG. 5. Sample tube aperture P is shown in FIG. 5 having central axis 44. At the top of sample tube aperture P there is placed facet F. Facet F is designed so that at all points about sample tube aperture P it defines a single plane. Further, this plane terminates at the base of frustum shaped portion 34 of sample tube aperture cores A.

This solution has two draw backs. First, facets F are difficult to machine in any mold. Second, between the discrete facets F, a discontinuity 46 exist where the facets F come together with adjacent sample tube apertures P. Further, and in some applications, web 48 between adjacent sample tube apertures P can be too thin.

Figure 6:
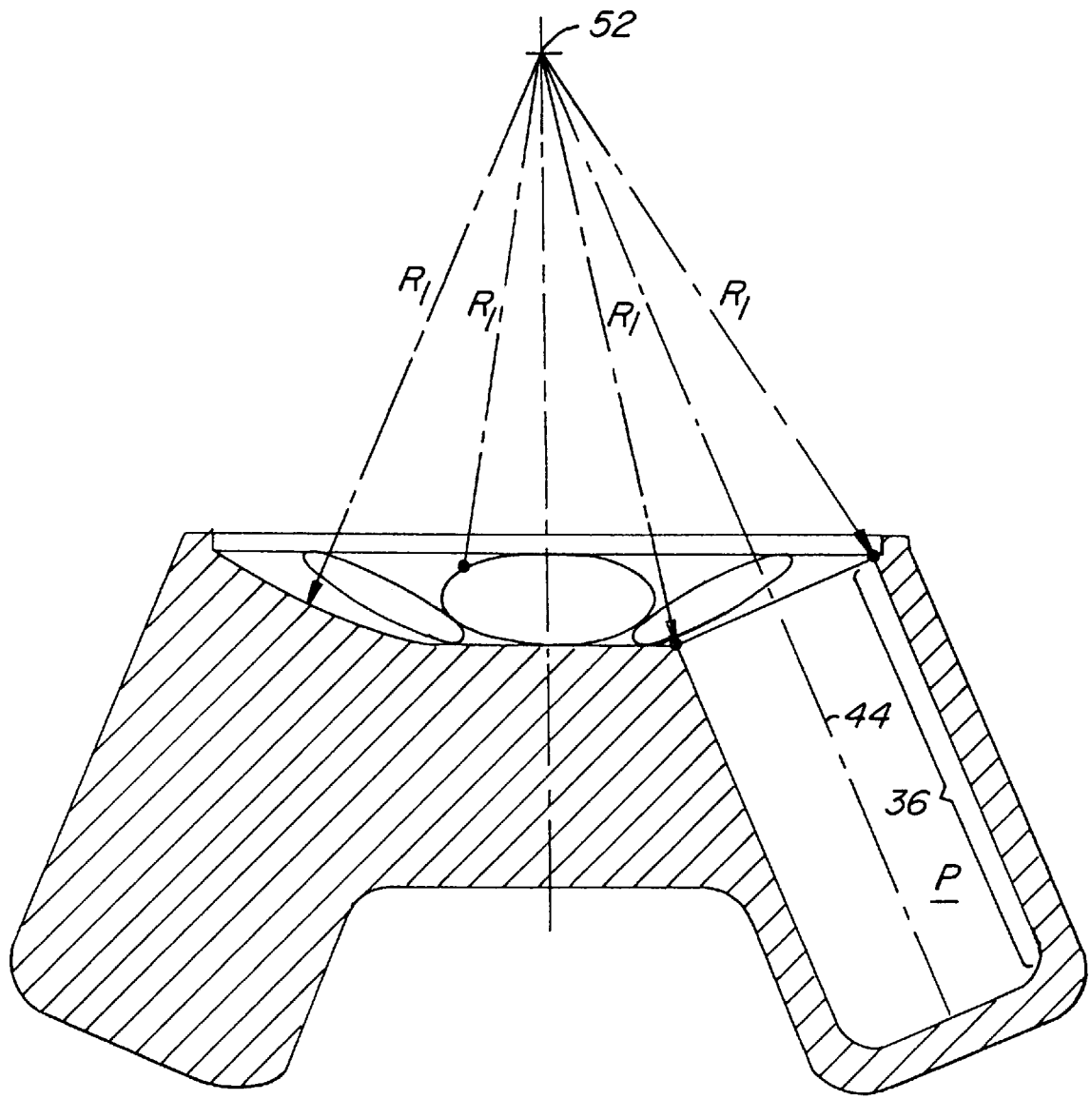
FIG. 6 illustrates the second and preferred solution in the form of a continuous spherical surface intersecting each of the sample tube aperture cores precisely at the plane defined by the base of the conical portion of the sample tube aperture cores and the cylindrical portion of the sample tube aperture cores; and, FIG. 7 is a perspective view of the fixed angle rotor illustrated in FIG. 6 showing the generation of the continuous spherical surface about the sample tube apertures cores.
Figure 7:
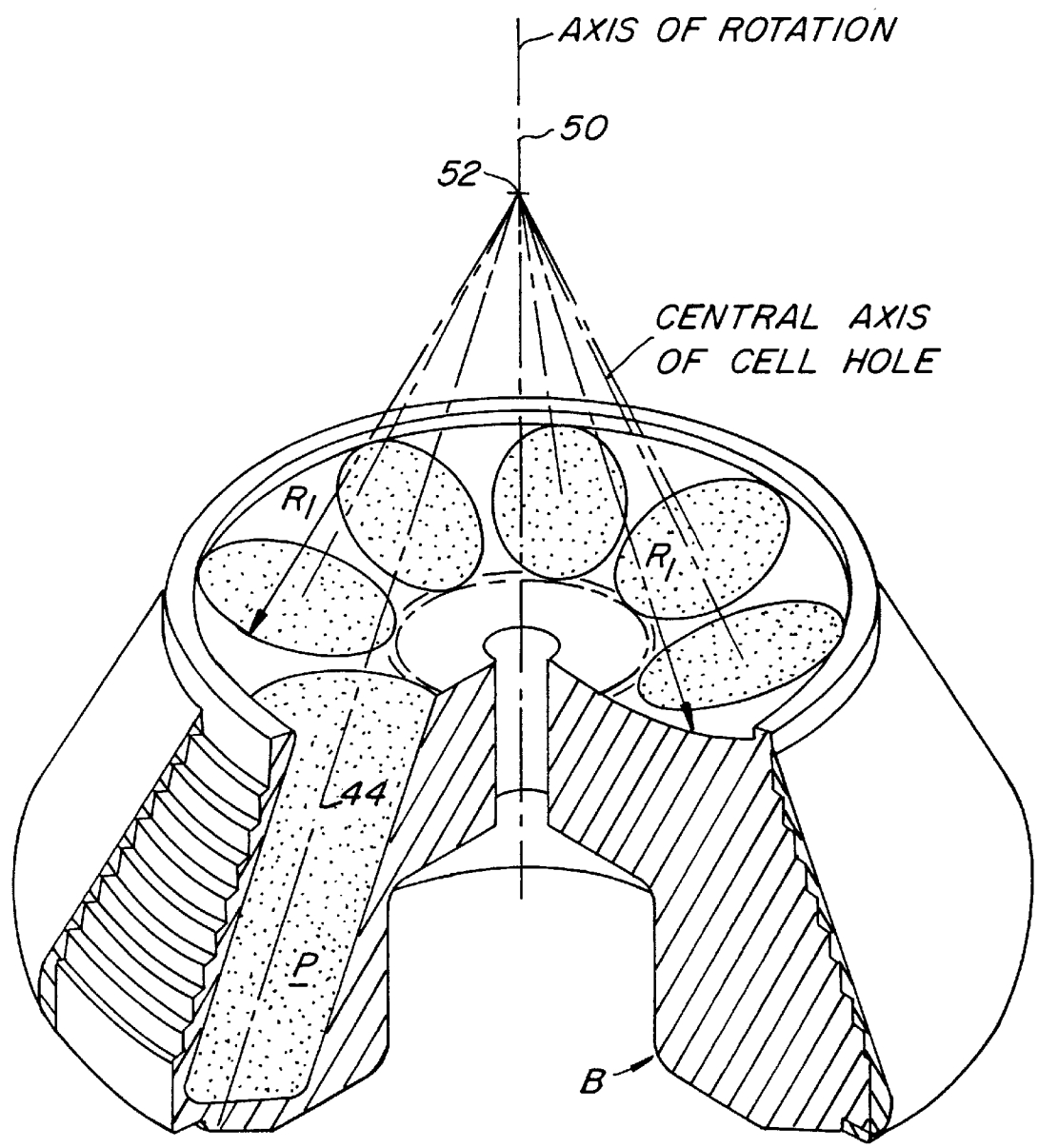

Referring to FIGS. 6 and 7, the preferred solution is indicated. Specifically, intersection 52 between central axis 44 of sample tube aperture P and spin axis 50 of rotor body B is located. Thereafter, concave spherical surface S is defined at radius $R_1$ and placed within rotor body B by machining a corresponding male spherical surface $S_M$. There results from this continuous and uninterrupted surface a preferred solution.

Over the solution of FIG. 5, the solution shown in FIGS. 6 and 7 is easy to machine, and does not have a discontinuity on concave spherical surface S. Further, radius $R_1$ can be adjusted so that web 48 is given a optimum thickness.

It is to be noted that this problem is an unusual problem which we have noted only after actual construction of molds. Accordingly, we claim invention in the discovery of the problem to be solved—as well as the solution to that problem.

What is claimed is:

1. In a process for compression molding fixed angle rotor having:

providing a symmetrical compression mold for compression molding a fixed angle rotor body, said fixed angle rotor body formed about a spin axis extending through a top, and the symmetrical compression mold having a first part for forming a bottom of the fixed angle rotor body and a second and mating part for forming a top of the fixed angle rotor body;

providing a plurality of sample tube apertures configured within the fixed angle rotor body, wherein each of said sample tube apertures is inclined at an identical angle with respect to the spin axis by providing sample tube aperture cores attached to the second and mating part for forming the top the top of the fixed angle rotor body and each of said sample tube apertures configured within the fixed angle rotor body, each of said sample tube aperture core inclined at an angle with respect to the spin axis of the rotor body with each sample tube aperture formed by the sample tube aperture cores symmetrically defined about a sample tube aperture axis which intersects the spin axis of the rotor body at a common point, such that each of said sample tube apertures further has a central axis with a sample tube aperture opening to the top of the rotor body nearer the spin axis and extending into the rotor body to a closed sample tube aperture bottom adjacent the bottom of the fixed angle rotor body further from the spin axis of the fixed angle rotor body;

providing the second and mating part of the compression mold with a configuration for defining in a compression molded rotor body at least one top surface adjacent the sample tube aperture opening of each sample tube aperture, the at least one top surface intersecting the edges of the sample tube apertures along a plane which is normal to the an axis of each of the sample tube apertures;

compression molding the rotor body symmetrically about the spin axis extending through the top and the bottom of the rotor body;

releasing the sample tube aperture cores from the second and mating part of the compression mold;

removing the sample tube aperture cores with the compression molded fixed angle rotor body with the at least one top surface including a plurality of facet surfaces defined at the edge of the compression molded fixed angle rotor body intersecting the at least one top surface intersecting edges of the sample tube apertures along a plane which is normal to the axis of each of the sample tube apertures.

2. The process of compression molding a fixed angle rotor according to claim 1 and wherein:

the at least one top surface includes a plurality of facet surfaces whereas one of said facet surfaces is defined at an edge of each of said sample tube apertures.

3. The process of compression molding a fixed angle rotor according to claim 1 and wherein:

the at least one top surface includes a single spherical top surface generated from a common point on the spin axis of the compression molded fixed angle rotor body.

* * * * *